United States Patent
Abe

(10) Patent No.: US 7,921,010 B2
(45) Date of Patent: Apr. 5, 2011

(54) INFORMATION PROCESSING APPARATUS, RECORDING MEDIUM, AND DATA SIGNAL

(75) Inventor: Hitoshi Abe, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1007 days.

(21) Appl. No.: 11/743,197

(22) Filed: May 2, 2007

(65) Prior Publication Data

US 2008/0055468 A1 Mar. 6, 2008

(30) Foreign Application Priority Data

Aug. 31, 2006 (JP) .................................. 2006-236387

(51) Int. Cl.
*G10L 15/00* (2006.01)

(52) U.S. Cl. ......... 704/235; 704/251; 715/201; 715/203

(58) Field of Classification Search .................. 704/235, 704/251; 715/201, 203
See application file for complete search history.

(56) References Cited

U.S. PATENT DOCUMENTS

| 6,701,014 | B1* | 3/2004 | Syeda-Mahmood | 382/199 |
| 2002/0133520 | A1* | 9/2002 | Tanner | 707/517 |
| 2003/0188255 | A1* | 10/2003 | Shimizu et al. | 715/501.1 |
| 2006/0082662 | A1* | 4/2006 | Isaacson | 348/231.99 |

FOREIGN PATENT DOCUMENTS

JP 2000-115736 A 4/2000

* cited by examiner

*Primary Examiner* — Daniel D Abebe
(74) *Attorney, Agent, or Firm* — Sughrue Mion, PLLC

(57) ABSTRACT

An information processing apparatus, comprising: an acquisition section that acquires a plurality of items of document information to be time-sequentially presented and movie information which includes speech that time-sequentially changes in association with the plurality of items of document information; a character string extracting section that extracts, from character strings included in the plurality of items of document information, character strings to be searched for; and a partial selecting section that selects a part of the movie information where at least one of the character strings to be searched for, which are extracted by the character string extracting section, is spoken in the speech included in the movie information.

4 Claims, 8 Drawing Sheets

TO NETWORK OR THE LIKE

FIG.5

| Tmin | Tmax | INFORMATION IDENTIFYING DOCUMENT INFORMATION |
|---|---|---|
| aaaa | bbbb | FIRST PAGE OF SLIDESHOW xxx |
| cccc | dddd | SECOND PAGE OF SLIDESHOW xxx |
| ⋮ | | ⋮ |

INFORMATION PROCESSING APPARATUS, RECORDING MEDIUM, AND DATA SIGNAL

CROSS-REFERENCE TO RELATED APPLICATIONS

This application is based on and claims priority under 35 U.S.C. 119 from Japanese Patent Application No. 2006-236387 filed on Aug. 31, 2006.

BACKGROUND

1. Technical Field

The invention relates to an information processing apparatus, a recording medium, and data signal.

2. Related Art

It is a widely accepted practice to output multiple groups of information, each of which is time-sequentially presented, in synchronization with each other. For example, there are systems in which, while information materials are being presented, explanatory video related to the information materials is provided together with sound. In those systems, multiple groups of information, such as the information materials and the video and sound, need to be synchronized with each other.

SUMMARY

According to an aspect of the invention, there is provided an information processing apparatus including: an acquisition section that acquires plural items of document information to be time-sequentially presented and movie information which includes speech that time-sequentially changes in association with the plural items of document information; a character string extracting section that extracts, from character strings included in the plural items of document information, character strings to be searched for; and a partial selecting section that selects parts of the movie information where at least one of the character strings to be searched for, which are extracted by the character string extracting section, is spoken in speech included in the movie information.

BRIEF DESCRIPTION OF THE DRAWINGS

An exemplary embodiment of the invention will be described in detail based on the following figures, wherein:

FIG. 5 is an explanatory diagram showing examples of information generated by the information processing apparatus according to the exemplary embodiment of the invention;

DETAILED DESCRIPTION

Figure 1:
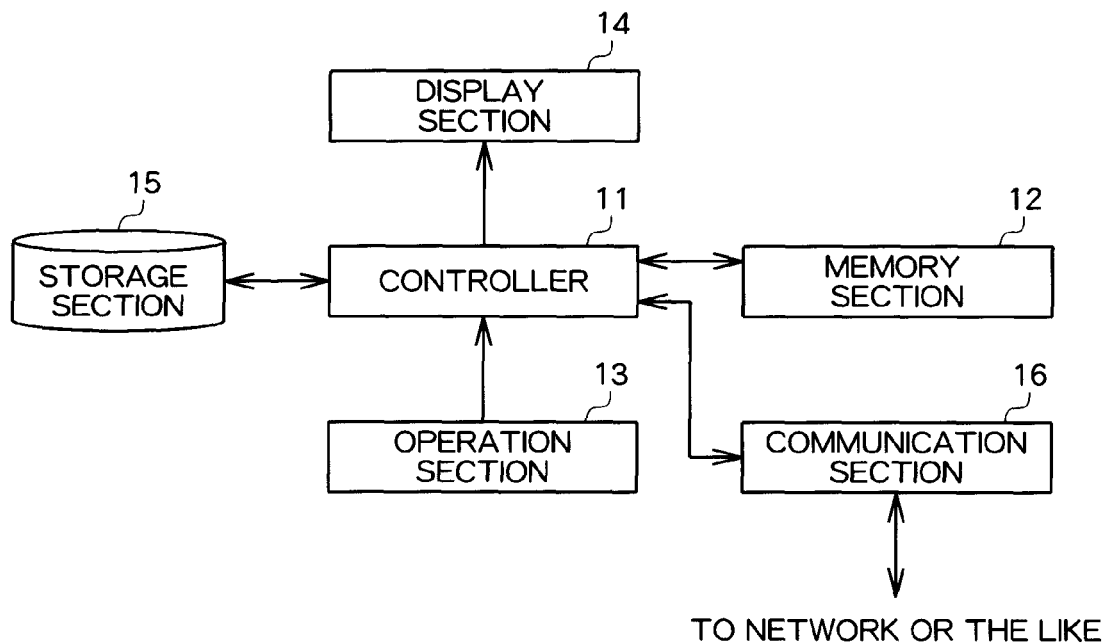
FIG. 1 is a configuration block diagram showing an example of an information processing apparatus according to an exemplary embodiment of the invention.

As shown in FIG. 1, an information processing apparatus according to an exemplary embodiment of the invention includes a controller 11, a memory section 12, an operation section 13, a display section 14, a storage section 15, and a communication section 16.

The controller 11 is a program controlling device such as a CPU and operates according to a program stored in the memory section 12. The controller 11 obtains, as processing targets, movie information and multiple items of document information to be presented time-sequentially. The movie information includes sound that changes time-sequentially in association with the document information. The controller 11 generates information used to present those items of document information in synchronization with the movie information. Specific processing contents of the controller 11 will be described later.

The memory section 12 includes a random access memory (RAM) and a read only memory (ROM) serving as examples of computer-readable recording media. The memory section 12 holds the program executed by the controller 11. The program may be provided by being stored in a computer-readable recording medium, such as a compact disc ROM (CD-ROM) or a digital versatile disc ROM (DVD-ROM), which records information optically, magnetically, or other methods. In addition, the memory section 12 acts as a work memory for the controller 11.

The operation section 13 is a keyboard or a mouse, for example, and accepts an operation of a user to output information indicating the content of the accepted operation to the controller 11. The display section 14 is a display such as a liquid crystal display device, and displays information according to an instruction received from the controller 11.

The storage section 15 includes a recording medium such as a hard disk. In this exemplary embodiment, the document information and the movie information, which are targets of the processing performed by the controller 11, are held in the storage section 15.

The communication section 16 is a network interface, for example, and sends information to a specified destination according to an instruction received from the controller 11. The communication section 16 outputs information received via a network to the controller 11.

Figure 2:
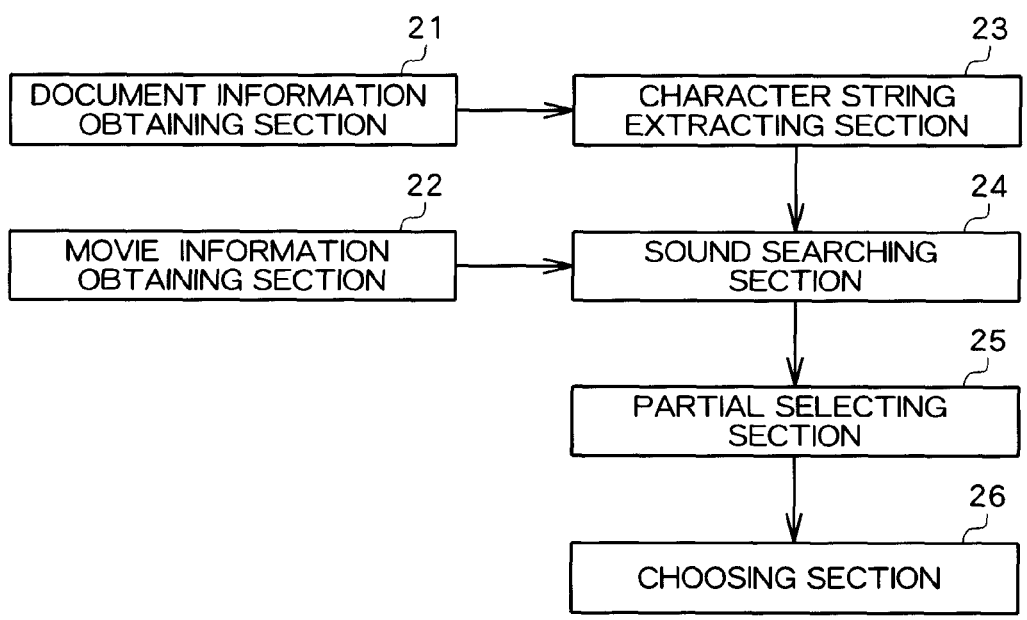
FIG. 2 is a functional block diagram showing the example of the information processing apparatus according to the exemplary embodiment of the invention.

Next, an operation of the controller 11 according to the exemplary embodiment of the invention will be described. When the controller 11 executes the program, the information processing apparatus of this exemplary embodiment is realized by software. As shown in FIG. 2, the information processing apparatus of the exemplary embodiment of the invention functionally includes a document information obtaining section 21, a movie information obtaining section 22, a character string extracting section 23, a sound searching section 24, and a partial selecting section 25, and a choosing section 26. In this description, in the information processing apparatus of the exemplary embodiment of the invention, the movie information serves as moving image information that includes sound information and information of a series of still images, and respective items of document information are provided at their predetermined reproduction periods of time while the moving image information is being reproduced. In other words, the description is given of an example case where multiple items of document information serving as slide information are presented in synchronization with moving image information in which a lecture and the like have been recorded.

The document information obtaining section 21 reads processing-target document information from the storage section 15. In this exemplary embodiment, the document information obtaining section 21 sequentially selects and obtains, as target document information, a series of document information to be synchronized with processing-target moving image information. The movie information obtaining section 22 reads the processing-target moving image information from the storage section 15.

The character string extracting section 23 extracts character strings included in the selectively-read target document information. In the character string extracting section 23, among the character strings included in the target document information, character strings to be searched for are divided into predetermined units (hereinafter, referred to as partial character strings). For example, a well-known morphological analysis engine may be used to divide a character string into morphemes (the minimum units of words linguistically having meanings). The character string extracting section 23 outputs at least one of the partial character strings obtained through the division.

The sound searching section 24 applies speech synthesis processing to each partial character string outputted by the character string extracting section 23, and generates phoneme information (information indicating a sound signal obtained at the time of pronunciation) corresponding to the partial character string. The sound searching section 24 searches sound information included in the moving image information for the phoneme information corresponding to the partial character string, and outputs information identifying the appearance position of the partial character string.

For example, when a character string "remote conference" is included in the target document information, the character string extracting section 23 extracts the words "remote" and "conference" through morphological analysis. The sound searching section 24 generates phoneme information indicating sound signals obtained when those words are pronounced, and searches the moving image information for the appearance positions of sound signals that match the phoneme information. Accordingly, points in time when the words are pronounced are identified in the movie information.

Figure 3:
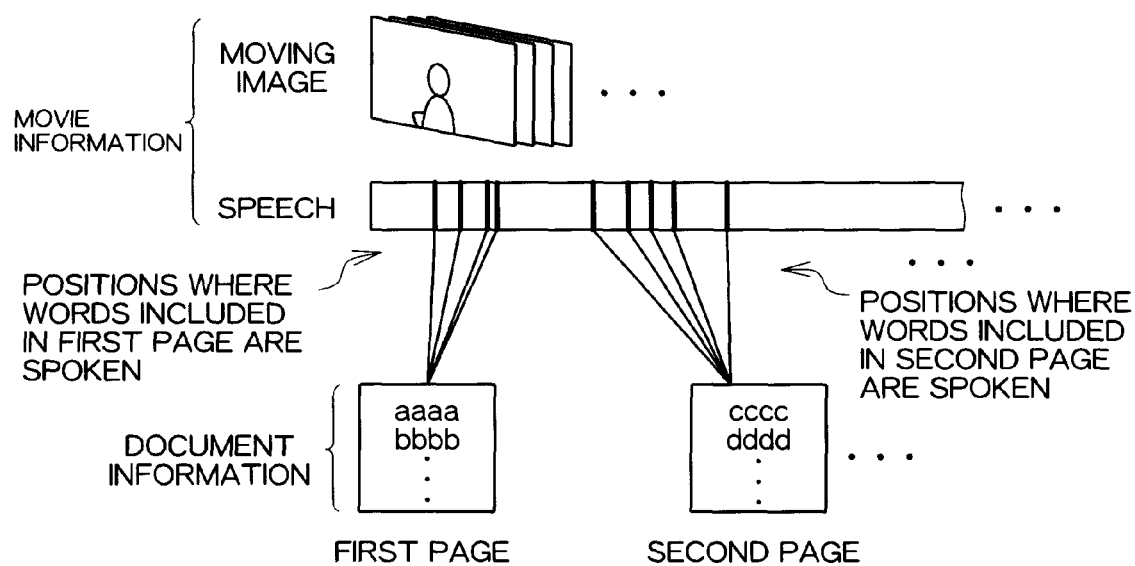
FIG. 3 is a conceptual diagram of an operation example of the information processing apparatus according to the exemplary embodiment of the invention.

The partial selecting section 25 generates a list of information indicating a point in time when each partial character string is pronounced in the moving image information, based on the information outputted by the sound searching section 24. As conceptually shown in FIG. 3, the list includes positions where respective words are spoken in the movie information such as the moving image information.

Figure 4:
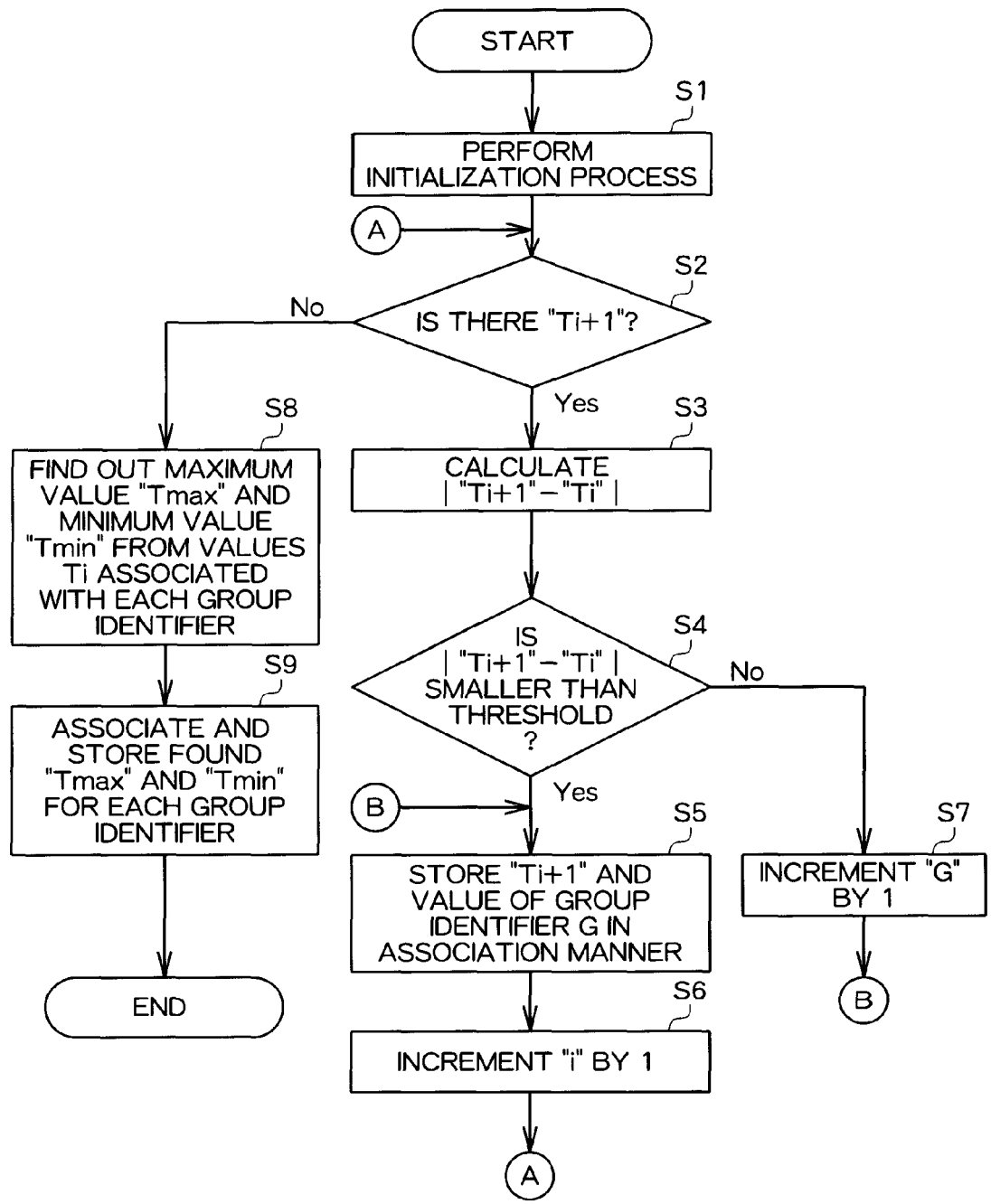
FIG. 4 is a flowchart showing an operation example of the information processing apparatus according to the exemplary embodiment of the invention.

The partial selecting section 25 sorts information indicating points in time included in the list in ascending order (or in descending order) T1, T2 . . . . The partial selecting section 25 performs the following processing sequentially from the top of the information. For example, as shown in FIG. 4, the partial selecting section 25 first resets "i" to 1 and initializes a group identifier G to "0" (initialization process: S1). Then, the partial selecting section 25 associates the group identifier G (that is, "0") with "Ti" (that is, T1) and stores the group identifier G and "Ti" in the memory section 12 as a group table.

The partial selecting section 25 judges whether the "i+1"-th value, i.e., "Ti+1", is included in the list (whether the list includes a value larger than Ti) (S2). When "Ti+1" is included in the list, the absolute value of the difference between "Ti+1" and "Ti", |"Ti+1"−"Ti"|, is calculated (if the information is sorted in ascending order, the absolute value may not be calculated, and if the information is sorted in descending order, "Ti+1" may be subtracted from "Ti" without calculating the absolute value) (S3).

The partial selecting section 25 judges whether the value calculated in Step S3 is smaller than a predetermined threshold (S4). When the value calculated in Step S3 is smaller than a predetermined threshold, the partial selecting section 25 associates the group identifier G with "Ti+1" and stores the group identifier G and "Ti+1" in the group table (S5). The partial selecting section 25 increments "i" by 1 (S6) and returns to Step S2 to continue the above-mentioned steps.

When the value calculated in Step S3 is not smaller than a threshold, the partial selecting section 25 increments the group identifier G by 1 (S7), moves to Step S5 to associate the incremented group identifier G with "Ti+1" and store the incremented group identifier G and "Ti+1" in the group table, and continues the above-mentioned steps.

When it is judged in Step S2 that "Ti+1" is not included in the list, the partial selecting section 25 refers to the group table to find out a minimum value "Tmin" and a maximum value "Tmax" from values "Ti" associated with an identical group identifier (S8). The partial selecting section 25 associates the minimum value "Tmin" and the maximum value "Tmax" for each group identifier and stores the minimum value "Tmin", the maximum value "Tmax", and the group identifier as group information (S9).

Through this processing, the partial selecting section 25 finds out a period of time during which sounds corresponding to the character strings included in document information are continuously detected at intervals shorter than a predetermined threshold. Accordingly, as conceptually shown in FIG. 5, in the movie information such as the moving image information, a period of time during which respective words included in the target document information are continuously spoken is found out as a distribution characteristic of the words included in the target document information.

In a case of a lecture given with a slideshow, a period of time during which character strings included in a certain slide appear concentratedly is regarded as a period of time when a content related to the slide is explained. In general, the period of time is included in one portion of movie information. However, among words included in the slide, commonly-used words and a word corresponding to the theme of the lecture appear repeatedly in an isolation manner in the movie information. The choosing section 26 selects a group identifier whose associated minimum value "Tmin" and maximum value "Tmax" have the largest difference, from group information stored in the memory section 12. The choosing section 26 associates "Tmin" and "Tmax" that are associated with this group identifier, with information identifying the target document information, and stores "Tmin", "Tmax", and the information identifying the target document information as synchronization information (FIG. 5).

Figure 6:
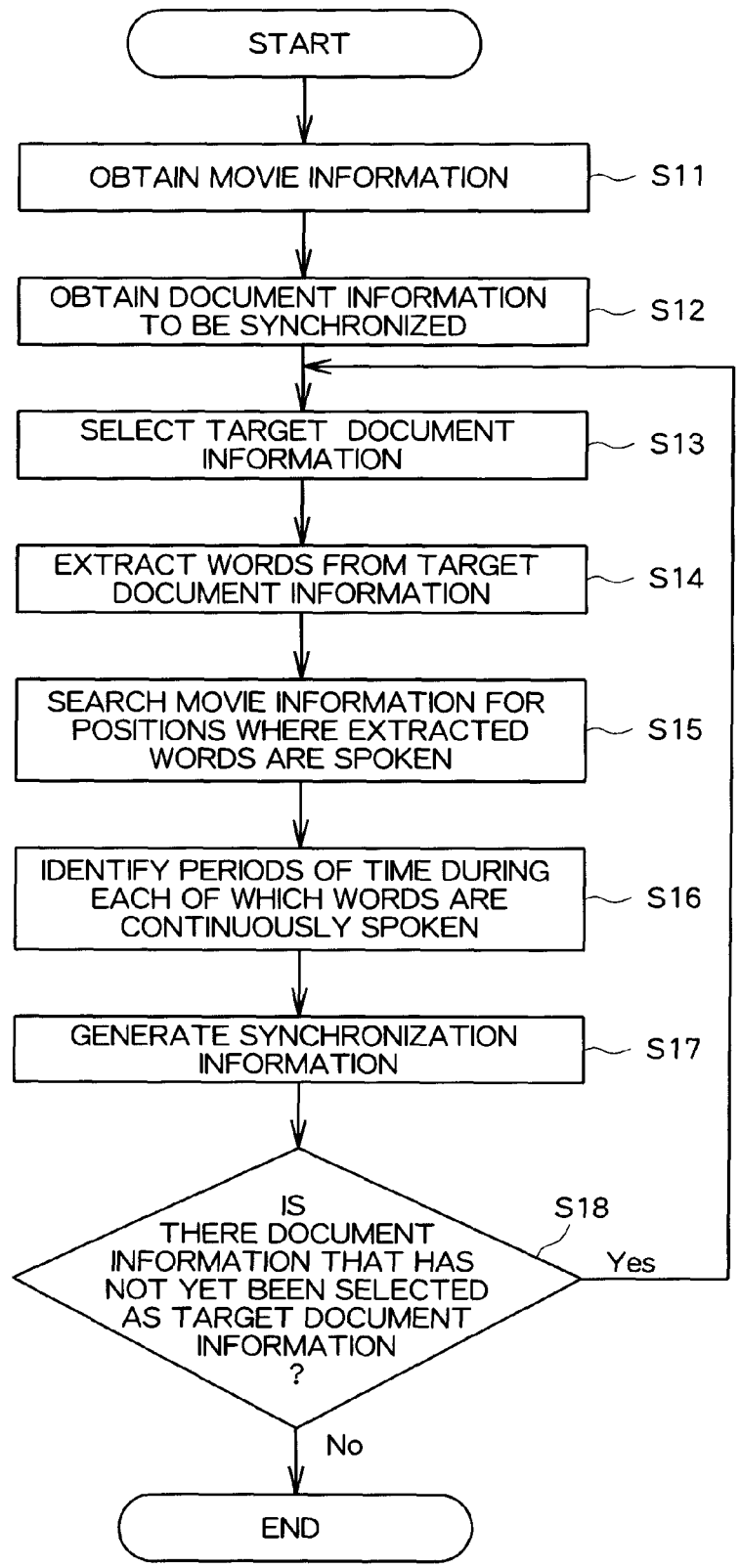
FIG. 6 is a flowchart showing an operation example of the information processing apparatus according to the exemplary embodiment of the invention.

Specifically, as shown in a flowchart of FIG. 6, according to the program, the controller 11 reads processing-target movie information (in this case, moving image information) from the storage section 15 (S11) and also reads multiple items of document information to be synchronized with this moving image information from the storage section 15 (S12). Then, among those items of document information, one item of document information that has not yet been selected as target document information is selected as target document information (S13), and multiple partial character strings are extracted from character strings included in the target document information (S14).

The controller 11 searches sound information included in the moving image information for phoneme information corresponding to each partial character string extracted in Step S14 to identify the appearance position of the partial character string (S15). The controller 11 finds out periods of time during each of which sounds corresponding to the character strings included in the target document information are continuously detected at intervals shorter than a predetermined threshold (S16). The controller 11 associates information indicating a period of time that satisfies a predetermined condition (such as a condition in which the period of time is longest, as described above), among the found periods of time, with information identifying the target document information, and stores them as synchronization information (S17).

The controller 11 judges whether there is document information that has not yet been selected as target document information among the multiple items of processing-target document information (S18). When there is document information that has not yet been selected as target document information, the controller 11 returns to Step S13 to continue the above-mentioned steps.

When it is judged in Step S18 that there is no document information that has not yet been selected as target document information, the controller 11 ends the processing.

The description has been given of a case where all words included in each item of target document information are used. However, some of the words may be selectively used. For example, the character string extracting section 23 may not extract all words obtained through the morphological analysis but may extract all words except predetermined words. As an example, all words may be extracted except words corresponding to particles and auxiliary verbs and words (such as "is" and "the") that are widely used in general documents.

Figure 7:
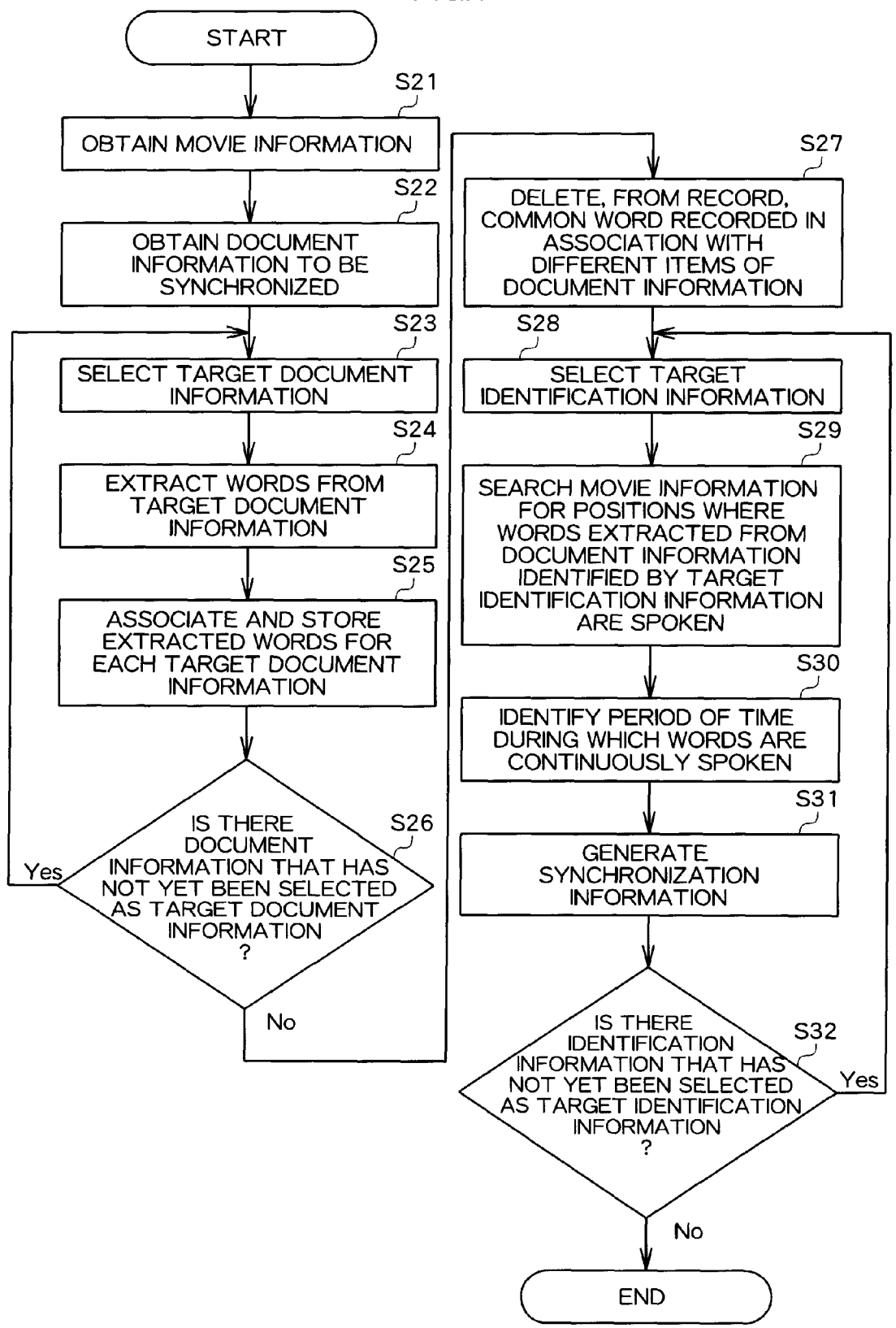
FIG. 7 is a flowchart showing another operation example of the information processing apparatus according to the exemplary embodiment of the invention.

The controller 11 may search for points in time at which words that appear uniquely in target document information, among multiple items of document information to be reproduced in synchronization with specified movie information, are spoken. In this case, as shown in a flowchart of FIG. 7, according to the program, the controller 11 reads processing-target movie information (in this case, moving image information) from the storage section 15 (S21) and also reads multiple items of document information to be synchronized with this moving image information from the storage section 15 (S22). Then, among those items of document information, one item of document information that has not yet been selected as target document information is selected as target document information (S23). Multiple partial character strings are extracted from character strings included in the target document information (S24) and the extracted partial character strings are associated with information identifying the target document information, and the partial character strings and the information identifying the target document information are stored as an extracted-character-string database (S25).

The controller 11 judges whether there is document information that has not yet been selected as target document information among the multiple items of processing-target document information (S26). When there is document information that has not yet been selected as target document information, the controller 11 returns to Step S23 to continue the above-mentioned steps.

When it is judged in Step S26 that there is no document information that has not yet been selected as target document information, the controller 11 refers to the extracted-character-string database and deletes a word that appears repeatedly, namely twice or more, because the word is associated with plural items of information identifying items of document information that differ from each other (S27).

For example, when the words "remote", "conference", "file", "format", and "flow" are extracted from one of the multiple items of document information read in Step S22 and the words "conference", "approval", and "method" are extracted from another one of the items of read information, since the word "conference" is extracted in association with different items of document information, the word "conference" is deleted from the extracted word group. Accordingly, among character strings which are included in each item of target document information and are targets of search, character strings other than a character string (in this case, a word) included in common in multiple items of the processing-target document information, and which are parts of these multiple items, are selected and extracted.

The controller 11 selects one item of identification information (which has not yet been selected as target identification information) which identifies document information stored in the extracted-character-string database, as target identification information (S28). The controller 11 generates phoneme information corresponding to respective words associated with the target identification information, and searches sound information included in the moving image information for the generated phoneme information to identify the appearance positions of the respective words (S29). The controller 11 finds out periods of time during each of which sounds corresponding to the character strings included in the target document information are continuously detected at intervals shorter than a predetermined threshold (S30). The controller 11 associates information indicating a period of time that satisfies a predetermined condition (such as a condition in which the period of time is longest, as described above), among the found periods of time, with the target identification information (information identifying the corresponding document information), and stores them as synchronization information (S31).

The controller 11 judges whether there is identification information that has not yet been selected as target identification information among the identification information included in the extracted-character-string database (S32). When there is identification information that has not yet been selected as target identification information, the controller 11 returns to Step S28 to continue the above-mentioned steps.

When it is judged in Step S32 that there is no identification information that has not yet been selected as target identification information, the controller 11 ends the processing.

The controller 11 presents the user with the synchronization information generated through the processing, by displaying the synchronization information. The user determines a time range during which each item of document information is presented while referring to the synchronization information.

Further, the controller 11 refers to time-range defining information ("Tmin" and "Tmax") which is included in the generated synchronization information and is associated with each of the k-th document information to be presented and the "k+1"-th document information to be presented in the order of reproduction. When "Tmax" associated with the k-th document information (hereinafter, referred to as "Tmax(k)") is larger than "Tmin" associated with the "k+1"-th document information (hereinafter, referred to as "Tmin(k+1)"), i.e., (1)

"Tmax(k)">"Tmin(k+1)", in other words, when the time ranges overlap, the controller 11 may perform the following processing.

Specifically, the controller 11 may set "Tmax(k)" to "Tmin(k+1)" to change the synchronization information, thereby performing time-range adjustment. Alternatively, the controller 11 may set "Tmin(k+1)" to "Tmax(k)" to change the synchronization information, thereby performing time-range adjustment. The controller 11 may decide which one of those adjustment methods is employed by a predetermined condition, thereby performing time-range adjustment by the decided adjustment method.

In this case, a predetermined condition may be used in which "Tmin" associated with the k-th document information (hereinafter, referred to as "Tmin(k)") is used, for example, to compare a value obtained by subtracting "Tmin(k)" from "Tmax(k)", "Tmax(k)−Tmin(k)", with a value obtained by subtracting "Tmin(k+1)" from "Tmax(k+1)", "Tmax(k+1)−Tmin(k+1)", and the time range of document information having a larger value is subjected to adjustment. As a specific example, when a value obtained by subtracting "Tmin(k+1)" from "Tmax(k+1)", "Tmax(k+1)−Tmin(k+1)", is larger than a value obtained by subtracting "Tmin(k)" from "Tmax(k)", "Tmax(k)−Tmin(k)", the time range of the "k+1"-th document information is subjected to adjustment in which "Tmin(k+1)" is set to "Tmax(k)" to change the synchronization information.

In addition, with reference to the time-range defining information ("Tmin" and "Tmax") of the k-th document information and the "k+1"-th document information, the controller 11 may perform the following processing when "Tmax" associated with the k-th document information ("Tmax(k)") is smaller than "Tmin" associated with the "k+1"-th document information ("Tmin(k+1)"), i.e., (2) "Tmax(k)"<"Tmin(k+1)", in other words, when two adjacent time ranges have a gap therebetween.

For example, the controller 11 may set "Tmax(k)" to "Tmin(k+1)" to change the synchronization information, thereby performing time-range adjustment. Alternatively, the controller 11 may set "Tmin(k+1)" to "Tmax(k)" to change the synchronization information, thereby performing time-range adjustment. The controller 11 may decide which one of those adjustment methods is employed by a predetermined condition, thereby performing time-range adjustment by the decided adjustment method.

A predetermined condition may be used in which "Tmin" associated with the k-th document information "Tmin(k)" is used, for example, to compare a value obtained by subtracting "Tmin(k)" from "Tmax(k)", "Tmax(k)−Tmin(k)", with a value obtained by subtracting "Tmin(k+1)" from "Tmax(k+1)", "Tmax(k+1)−Tmin(k+1)", and the time range of document information having a smaller value is subjected to adjustment. As a specific example, when a value obtained by subtracting "Tmin(k)" from "Tmax(k)", "Tmax(k)−Tmin(k)", is smaller than a value obtained by subtracting "Tmin(k+1)" from "Tmax(k+1)", "Tmax(k+1)−Tmin(k+1)", the time range of the k-th document information is subjected to adjustment in which "Tmax(k)" is set to "Tmin(k+1)" to change the synchronization information.

Further, when a predicted reproduction end time of "Tmax" associated with the document information to be presented last precedes reproduction end time "Tend" of the movie information (when "Tmax" is smaller than "Tend"), the controller 11 may set "Tmax" and "Tend" to have an identical value (i.e., "Tmax"="Tend") to change the synchronization information.

Figure 8:
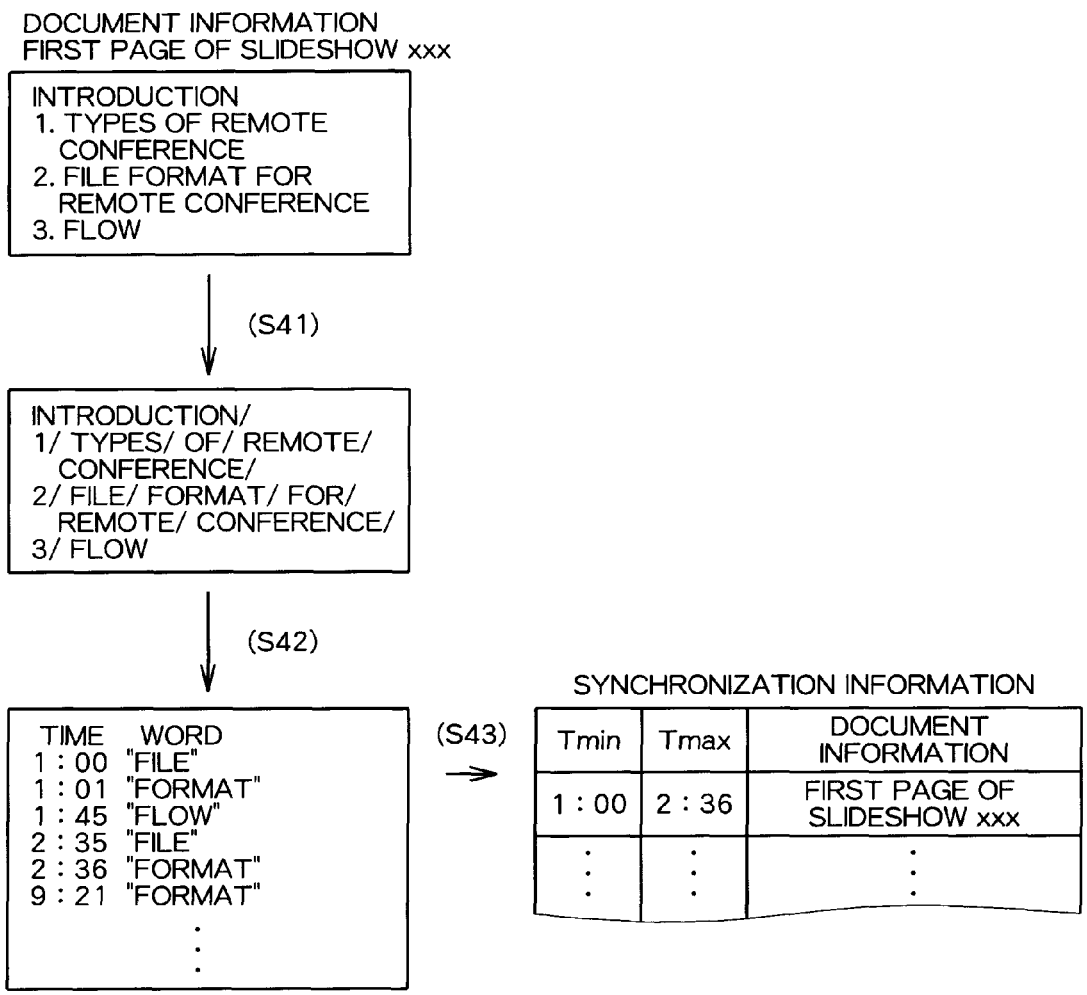
FIG. 8 is a flow diagram showing an operation flow of the information processing apparatus according to the exemplary embodiment of the invention.

An operation example of the information processing apparatus according to this exemplary embodiment will be described with reference to FIG. 8. The information processing apparatus selects one item of document information to be presented in synchronization with processing-target movie information, as target document information, and extracts words included in the target document information (S41). Next, the information processing apparatus searches the movie information for portions where (points in time when) the extracted words are spoken (S42). The information processing apparatus identifies a period of time during which the words are continuously spoken at intervals of, for example, one minute or less, and records the identified period of time and information identifying the target document information (for example, information indicating "the first page of the slideshow" or the like) in an associated manner (S43). The information processing apparatus presents the user with this record after applying the same processing to the other items of document information. The user performs the adjustment as needed while referring to the presented record, and stores the resultant record in the storage section 15 or the like as synchronization information.

The controller 11 may perform control processing in which, while movie information is distributed to a client device connected through a communication resource such as a network by using a well-known streaming technology, document information identified by information associated with the information of the recorded period of time is also distributed from the distribution start time of the movie information for this period of time, and the client device is caused to display them.

Figure 9:
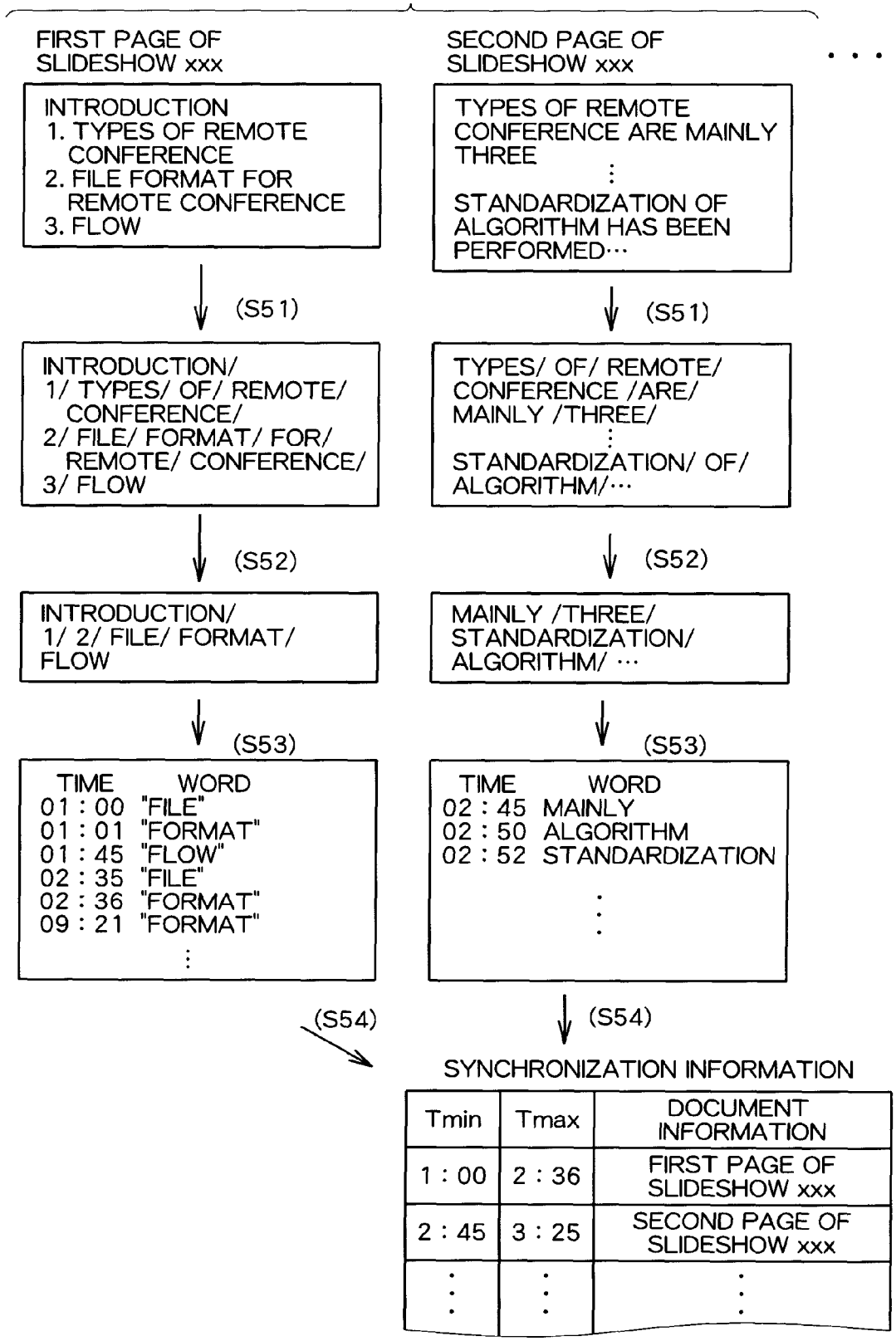
FIG. 9 is a flow diagram showing another operation flow of the information processing apparatus according to the exemplary embodiment of the invention.

Another operation example of the information processing apparatus according to the exemplary embodiment will be described with reference to FIG. 9. While sequentially selecting, as target document information, items of document information to be presented in synchronization with processing-target movie information, the information processing apparatus extracts words included in each item of the target document information (S51). Next, the information processing apparatus selects one of the items of document information again as target document information and deletes, from the words extracted from the target document information, a word common to that extracted from the document information other than the target document information (S52). The information processing apparatus searches the movie information for portions where (points in time when) thus obtained words (unique text) which are unique to the target document information are spoken (S53). The information processing apparatus identifies a period of time during which the words are continuously spoken at intervals of, for example, one minute or less, and records the identified period of time and information identifying the target document information (for example, information indicating "the first page of the slideshow" or the like) in an associated manner (S54). The information processing apparatus presents the user with this record after applying the same processing to the other items of document information. The user performs the adjustment as needed while referring to the presented record, and stores the resultant record in the storage section 15 or the like as synchronization information.

The information processing apparatus of this exemplary embodiment may generate summary information of movie information by performing processing in which the movie information is divided into multiple zones with an elapse of reproduction time, the total number of appearances of words extracted from each item of target document information is calculated for each zone, and an interval having a total number exceeding a predetermined threshold is selectively extracted from the movie information.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
    an acquisition section that acquires a plurality of items of document information to be time-sequentially presented and movie information which includes speech that time-sequentially changes in association with the plurality of items of document information;
    a character string extracting section that selects one of the plurality of items of document information as target document information, and extracts character strings from the target document information, and selects character strings other than character strings included in common in the plurality of items of document information as character strings to be searched for; and
    a partial selecting section that selects a parts of the movie information in which at least one of the character strings to be searched for is spoken in the speech included in the movie information;
    a choosing section that chooses a period of time during which the time of the parts selected by the partial selecting section are continued at intervals of a predetermined time or less;
    a recording section that records the period of time chosen by the choosing section and the target document information in an associated manner.

2. The information processing section according to claim 1, wherein the partial selecting section outputs information identifying, for each of the character strings to be searched for, the selected part of the movie information corresponding to the character string.

3. A computer readable recording medium storing a program causing a computer to execute a process comprising:
    acquiring a plurality of items of document information to be time-sequentially presented and movie information which includes speech that time-sequentially changes in association with the plurality of items of document information;
    selecting one of the plurality of items of document information as target document information;
    extracting character strings from the target document information;
    selecting character strings other than character strings included in common in the plurality of items of document information as character strings to be searched for;
    selecting parts of the movie information in which at least one of the character strings to be searched for is spoken in the speech included in the movie information;
    choosing a period of time during which the time of the selected parts are continued at intervals of a predetermined time or less; and
    recording the period of time and the target document information in an associated manner.

4. An information processing method comprising:
    acquiring a plurality of items of document information to be time-sequentially presented and movie information which includes speech that time-sequentially changes in association with the plurality of items of document information;
    selecting one of the plurality of items of document information as target document information;
    extracting character strings from the target document information;
    selecting character strings other than character strings included in common in the plurality of items of document information as character strings to be searched for;
    selecting parts of the movie information in which at least one of the character strings to be searched for is spoken in the speech included in the movie information;
    choosing a period of time during which the time of the selected parts are continued at intervals of a predetermined time or less; and
    recording the period of time and the target document information in an associated manner.

* * * * *